(No Model.)

W. F. WIMPEE.
FRUIT PICKER.

No. 288,685. Patented Nov. 20, 1883.

Witnesses.
Frank McBee
John W. Cobb

William F. Wimpee  Inventor.
by John Pratt  Atty

UNITED STATES PATENT OFFICE.

WILLIAM F. WIMPEE, OF CENTRE, ALABAMA.

FRUIT-PICKER.

SPECIFICATION forming part of Letters Patent No. 288,685, dated November 20, 1883.

Application filed February 21, 1883. (No model.)

*To all whom it may concern:*

Be it known that I, WILLIAM F. WIMPEE, a citizen of the United States, residing at Centre, in the county of Cherokee and State of Alabama, have invented a new and useful Fruit-Picker, of which the following is a specification.

My invention relates to that class of machines intended to pluck arboreal fruits, or those growing on vines, by means of a shears and a receptacle attached thereto—basket or sack, as may be desired—and relates to the mode of operating said shears. I attain this object by the mechanism illustrated in the accompanying drawings, in which—

Figure 1:
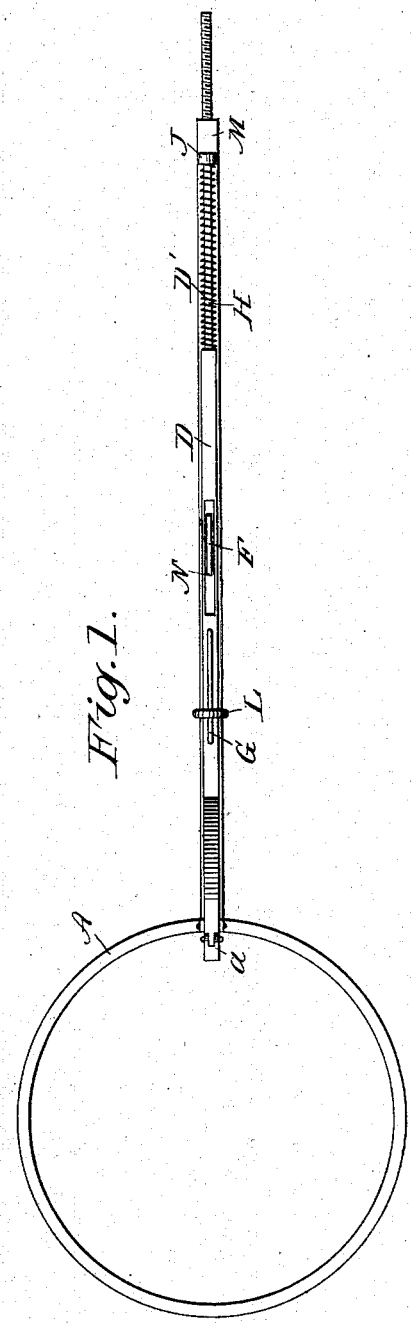
Figure 2:
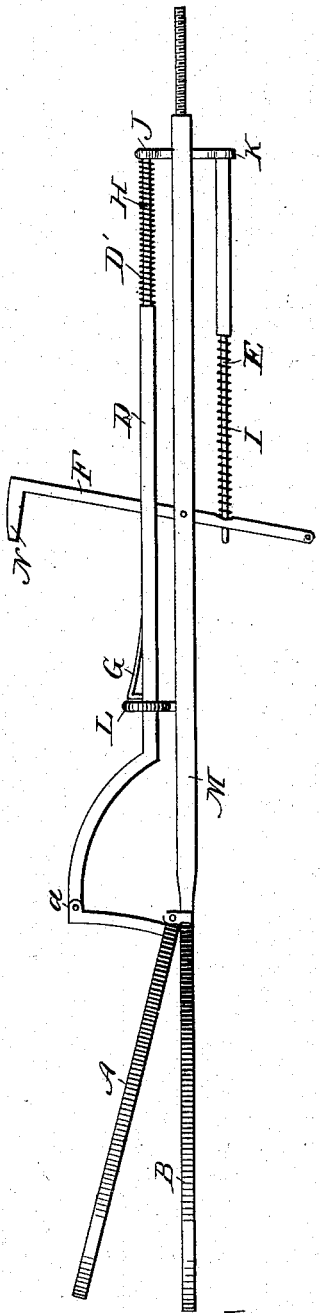

Figure 1 is a plan of the shears and operative mechanism with shears closed. Fig. 2 is a side elevation of same open.

Similar letters refer to similar parts throughout the several views.

A and B are the upper and lower blades of the shears, which may be circular, as shown here, or square, and may have either a sack suspended to the lower blade or a basket forming part thereof, to receive the fruit as plucked, the shears being employed to sever the stems thereof. These blades are hinged, as shown. The lower blade is provided with a handle, M, which may be screwed into a staff of any desired length.

The mechanism for operating said blades consists of rods D and E, trigger F, detent or catch G, springs H and I, and ring L. Rods D and E are loosely stepped in standards J and K, so as to admit a slight lateral movement. Rod D is hinged to blade A at $a$, and slides in ring L, which is affixed to rod M, said rod M being said handle of the shears. Rod D is perforated longitudinally, so as to form a tube about one inch long from its free end, where it receives piston-rod D', which is incased in the spiral spring H. Rod D' by an equivalent arrangement may be a prolongation of D, and may slide in the hole in J. Trigger F works in a slot and is hinged in a slot in M. A slot or trigger, F, receives the free end of rod E. Detent G is riveted in a groove in the upper surface of rod D, and thinned at the riveted end, so as to act as an umbrella-like spring-catch. Its normal position, as also that of the whole mechanism, is shown in Fig. 2. The slot in rod D is of about the same length as the tubular part of said rod, and the normal position of trigger F is at the right-hand end of said slot. Spring I is made strong enough to open the shears through the intervention of said trigger, and in so doing to overcome the resistance of the opposing spring H until the limit of motion is reached, and the detent G passes through and behind ring L, and, springing up, is caught and held by said ring after the manner of an umbrella-catch. This movement is performed automatically by the pressure of spring I, as aforesaid, and brings the mechanism to the normal position. The mechanism being in normal position, to operate it it is only necessary to retract the lower end of the trigger against spring I, thus withdrawing it from opposing interference with spring H, and whereby also the beak N of said trigger is pressed on the catch or detent G, which frees rod D and allows spring H to drive it and close the shears with a snap. The trigger at the instant of this movement, being at the left extremity of the longitudinal slot in D, is out of the way of its movement, and offers no impediment thereto. Trigger F is now released, and the mechanism resumes its normal position, and thus to operate the picker it is only necessary to alternately pull and release the trigger, which may be done rapidly. Trigger F may be connected by cord or wire with a finger-lever at the hand end of a staff of any desirable length.

Having thus described my invention and the mode of operating the same, I desire to claim and secure by Letters Patent—

A fruit-gatherer consisting of a shears, A B, combined with and operated by two automatic interacting springs, H I, the one stronger than and overpowering the other, together with a detent, G, and trigger F, substantially as and for the purpose described.

WILLIAM F. WIMPEE.

Witnesses:
JAMES E. WIMPEE,
THOS. R. MATTHEWS.